United States Patent [19]

Economy et al.

[11] 3,890,262

[45] June 17, 1975

[54] PYROGENOUS RESIDUE-NOVOLAC FIBERS

[75] Inventors: James Economy, Eggertsville; Francis J. Frechette, Tonawanda; Ruey Y. Lin, Williamsville; Luis C. Wohrer, Lewistown, all of N.Y.

[73] Assignee: The Carborundum Company, Niagara Falls, N.Y.

[22] Filed: Apr. 11, 1974

[21] Appl. No.: 460,244

Related U.S. Application Data

[63] Continuation of Ser. No. 253,603, May 15, 1972, abandoned.

[52] U.S. Cl. ............. 260/28; 260/28.5 AS; 260/38; 423/447

[51] Int. Cl. ............................................ C08g 51/52
[58] Field of Search ................ 260/28, 38; 423/447

[56] References Cited
UNITED STATES PATENTS

| | | | |
|---|---|---|---|
| 3,595,946 | 7/1971 | Soo | 264/29 |
| 3,639,953 | 2/1972 | Kimura | 23/209.1 |

*Primary Examiner*—Melvyn I. Marquis
*Attorney, Agent, or Firm*—David E. Dougherty; Herbert W. Mylius

[57] ABSTRACT

A fusible organic fiber comprising a novolac and a pyrogenous residue such as pitch is rendered infusible by reacting with an aldehyde.

9 Claims, No Drawings

PYROGENOUS RESIDUE-NOVOLAC FIBERS

This is a continuation, of copending application Ser. No. 253,603, filed May 15, 1972 and now abandoned.

BACKGROUND OF THE INVENTION

The present invention relates to fibers comprising a pyrogenous residue and novolac and a method for their production.

Methods of the prior art for preparing infusible pitch fibers, such as described in U.S. Pat. No. 3,595,946, generally require extensive treatment of the pitch prior to spinning a fusible fiber and subsequently oxidizing the fusible fiber with ozone and air for a long period of time to form an infusible sheath on the fiber. U.S. Pat. No. 3,595,946 describes a treatment suited for coal tar pitch while British specification No. 1,091,890 describes a treatment suited for petroleum pitch. Prior art processes have concentrated on oxidizing the fusible pitch fiber to render it infusible and thus require complicated or time consuming processes.

SUMMARY OF THE INVENTION

The fusible organic fiber of the present invention is produced by forming a melt of a mixture of a pyrogenous residue and novolac and fiberizing the melt. An infusible fiber is produced by reacting the fusible organic fiber with formaldehyde.

The process of the present invention permits the use of a wide variety of pitches which are generally available and economical. The incorporation of a novolac with a pyrogenous residue such as pitch improves the spinnability of the pitch and facilitates the preparation of a fusible fiber. The fusible fiber of the present invention is processed to an infusible fiber which posseses superior flame resistance by a short curing process. Thus, the process of the present invention obviates deficiencies found in the prior art processes and products.

DETAILED DESCRIPTION

The starting pyrogenous residues that can be used in the process of the present invention include a variety of pitches such as coal tar pitches, pitches obtained by distillation of oils, petroleum pitches, pyrogenous asphalts, and a variety of pitch-like substances produced as by-products of various industrial processes such as distillation residues. Preferably, the starting pyrogenous residue has a softening point of about 80°C to about 200°C, more preferably from about 100°C to about 150°C. Preferably, the pyrogenous residue has a carbon to hydrogen ratio based on weight percent from about 18 to about 25. The content of aromatic and unsaturated components varied depending on the source of the raw material pyrogenous residue.

Preferably, pyrogenous residues used as starting materials have a beta-resin content greater than about 5 percent and preferably greater than 10 percent by weight. The beta-resin is the benzene insoluble content of the pyrogenous residue minus the quinoline insoluble content. In making the determination, there are other solvents, such as toluene, which can be substituted for benzene and pyridene which can be substituted for quinoline. The beta-resin portion of the pyrogenous residue is believed to enhance the binding and adhesive qualities thereof. It is believed that a suitable amount of beta-resin contributes to rendering the fusible fiber infusible by a short curing process. The upper limit of the weight percent of beta-resin in the starting pyrogenous residue is not critical but is generally limited by the type of pitch used and process conditions. Most commercially available pitches have a beta-resin content less than about 30 percent but pitches with beta-resin content higher than 45 percent can be used in the present invention.

Generally, commercially available coal tar pitch has a benzene insoluble content of about 20 to about 50 percent by weight and a quinoline insoluble content of about 10 to about 20 percent by weight with a resulting beta-resin content in the range of about 10 to 30 percent. These pitches are suited for using as a starting material in the process of the present invention without further modification.

Petroleum pitches and pyrogenous asphalts often have beta-resin contents less than about 5 percent. This is generally due to a low percentage of benzene insolubles which is generally less than about 10 percent. In such a case, while the fusible fiber of pyrogenous residue and novolac can be rendered infusible by reacting with formaldehyde, the curing process is comparatively slow. Alternatively, it is possible to upgrade the pitch by increasing the beta-resin content. Such upgrading can be done by reacting the pitch or asphalt with an aldehyde and phenolic compound in the presence of an acid catalyst at a temperature sufficiently high to effect condensation between the pitch or asphalt, aldehyde and phenolic compound. Such a method is described in British specification No. 1,080,866 and U.S. Pat. No. 3,301,803 which are incorporated into the present case by reference. The amount of aldehyde and phenolic compound that is employed can vary widely depending on the degree of upgrading necessary. The reaction is carried out at a temperature from about 150°F to about 600°F for a suitable period of time.

The amount of quinoline insolubles in the starting pyrogenous residue should be less than about 20 percent by weight and preferably less than about 10 percent. As the percentage of quinoline insolubles in the starting pyrogenous residue is decreased, the ease of fiberization of the melt is increased and the uniformity of the fibers is enhanced. The most preferred starting pyrogenous residue contains zero or very low percentage of quinoline insolubles. The quinoline insolubles represent material which is not soluble in the pyrogenous residue at the spinning temperature and which forms an undesirable second phase. Removal of the quinoline insolubles can be accomplished by diluting the pitch in an appropriate solvent and filtering or centrifuging to remove the insolubles. Such a method is described in U.S. Pat. No. 3,595,946.

A wide variety of novolac resins may be used as starting materials in the process of the present invention. The term novolac refers to a condensation product of the phenolic compound with formaldehyde, the condensation being carried out in the presence of a catalyst to form a novolac resin wherein there are virtually no methylol groups such as present in resoles and wherein the molecules of the phenolic compounds are linked together by a methylene group. The phenolic compound may be phenol, or phenol wherein one or more of the non-hydroxylic hydrogens are replaced by any of various substituents attached to the benzene ring, a few examples of which are the cresoles, phenyl phenols, 3,5-dialkylphenols, chlorophenols, resorcinol, hydroquinone, chloroglucinol and the like. The phenolic compound may instead be naphthyl or hydroxyphenanthrene or another hydroxyl derivative of a compound having a condensed ring system.

For purposes of the present invention, any fusible novolac which is capable of further polymerization with a suitable aldehyde may be employed for the production of fibers. Stated another way, the novolac molecules must have two or more available sites for further polymerization. Apart from this limitation, any novolac might be employed, including modified novolacs, i.e., those in which a non-phenolic compound is also included in the molecule, such as the diphenyl oxide or bisphenol-A modified phenol formaldehyde novolac. Mixtures of novolacs may be employed or novolacs containing more than one species of phenolic compounds may be employed.

Novolacs generally have a number-average molecular weight in the range from about 500 to about 1,200, although an exceptional case is the molecular weight may be as low as 300 or as high as 2,000 or more may occur. Unmodified phenol formaldehyde novolacs usually have a numberaverage weight in the range from about 500 to about 900, most of the commercially available materials falling within this range.

Preferably, novolacs with a molecular weight from about 500 to about 1,200 are employed in the method of the present invention. When a very low molecular weight novolac is used, the temperature at which such novolacs soften and become tacky is usually comparatively low. Therefore, it is necessary to cure the fiberized novolac at a very low temperature to avoid adherence and/or deformation of the fibers. It is usually undesirable to employ such low curing temperatures since the curing rate increases dramatically with the increase in temperature and low curing entails the practical disadvantage of a prolonged curing cycle. It is generally preferred to employ a novolac having a moderately high molecular weight for the type of novolac under consideration to permit curing in a reasonable time without adherence and/or deformation, but to avoid the extreme upper end of the molecular weight range to minimize problems in fiberizing due to gelling.

A mixture of pyrogenous residue and novolac may be formed by any convenient technique such as dry blending or melting the pyrogenous residue and novolac by heating together to form a homogeneous mixture. Mixtures containing from about 5 to about 40 percent by weight novolac can be used for preparing the fibers of the present invention. Since the pyrogenous residue is the most economically available component of the mixture, it is preferred to employ less than about 35 percent novolac by weight. It is preferable that the novolac content be at least about 10 percent and more preferably that it be at least about 25 percent in the mixture so that the spinnability of the fiber is enhanced and the curing time can be sufficiently reduced. Preferably, the mixture consists essentially of the pyrogenous resiude and novolac.

The fiberization can be performed by any convenient method such as drawing a continuous filament downwardly from an orifice in the bottom of the vessel containing a molten mixture of pitch and novolac. The filament is wound and collected on a revolving take-up spool mounted below the orifice. The take-up spool also serves to attenuate the filament as it is drawn from the orifice before it cools and solidifies upon contacting the atmosphere between the orifice and the spool. The melt can also be formed into short staple fibers by methods known in the prior art such as blowing the melt through a fiberizing nozzle and collecting the cooled fibers for blowing a thin stream of melt into the path of a hot blast of gas. These methods produce a staple consisting of a multiplicity of fusible uncured pitch-novolac fibers of variable length and diameter. The diameter of the fibers can vary from 0.1 micron to about 300 microns.

When producing a continuous filament having a uniform diameter by melt spinning, preferably the fibers have diameters from about 10 to about 30 microns. The filament diameter depends primarily upon two factors, the drawing rate and the flow rate of the melt through the orifice. The fiber diameter decreases as the drawing is increased and increases as the flow rate of the melt is increased. The flow rate of the melt depends primarily upon the diameter and length of the orifice and the viscosity of the melt, increasing as the orifice diameter is increased, decreasing as the length of the orifice is increased, and increasing as the viscosity of the melt is decreased. An increase of flow rate may also be effected, if desired, by applying pressure to the melt to force it through the orifice.

Curing of the fusible fiber to render it infusible is effected by heating the uncured fusible fiber in a liquid or gaseous formaldehyde environment. It appears that the curing mechanism involves the diffusion of the formaldehyde into the fiber and reaction of the novolac and formaldehyde to bring about polymerization of the novolac and pyrogenous residue mixture.

It is preferred to effect curing by heating the uncured fusible fibers in an environment containing paraformaldehyde in the presence of a catalyst. The environment may be gaseous, but is preferably liquid as in a solution of the catalyst and formaldehyde. Liquid is preferred because of the greater rapidity of heat and material transport to the fibers, especially the fibers in the interior portions of a bundle of fibers being cured, and also because higher concentrations of formaldehyde and catalysts may be achieved by employing a solution thereof.

Any of a wide variety of acids or bases may be used as the catalysts, any of the mineral acids or bases such as hydrochloric, sulfuric, phosphoric, ammonia hydroxide, potassium hydroxide, sodium hydroxide and organic acids or bases such as oxalic acid, or dimethylamine.

When a solution is employed for the curing step, water is the choice of solvent although other liquids may be employed provided that they do not adversely affect the fiber and are capable of dissolving the formaldehyde in a solution containing the catalyst. Preferably, the solution contains from about 12 to about 18 percent formaldehyde. When an acid catalyst is used, it is preferred that the solution contain from about 12 to about 18 percent acid, and when a base catalyst is used, from a about 1 to about 10 percent base. Lower concentrations of catalysts or formaldehyde in the solution generally require longer curing times. Higher concentrations of formaldehyde or catalysts do not appear to offer any advantage.

When curing is carried out in a gaseous environment, any gaseous catalyst such as hydrogen bromide, hydrogen chloride or ammonia may be employed. The formaldehyde may conveniently be generated by heating paraformaldehyde. The gaseous atmosphere may contain as little as about 10 percent formaldehyde up to as much as 99 percent, by volume, and from about 1 percent to about 90 percent, by volume, of the acid. If desired, the atmosphere may also contain a diluent such as nitrogen or other inert gas, but air should be excluded to minimize the possibility of side reactions taking place.

In either a gaseous or liquid environment, the rate of curing increases with increasing temperature. It is possible to cure the pitch-novolac fibers at room temperature (25°C) but is highly impractical to do so because of the time required. In the interest of minimizing the curing time, it is preferred to cure the fibers at the highest temperature at which adherence and/or deformation of these fibers does not occur. In general, the lower the molecular weight of the mixed resin, the lower the temperature at which these occur. Therefore, it is usually preferred not to use extremely low molecular weight resins, thereby avoiding the need for low curing temperature and the attendent slow curing rates.

It is usually desirable to carry out the curing cycle at gradually increasing temperatures. Initially, a temperature is employed at which adherence and/or deformation does not occur. At this stage, the outer portion of the fiber begins to cure, forming a shell, and thereupon, the temperature may be raised as necessary to complete the cure, the shell eliminating problems due to fusion which might otherwise occur.

The curing time must be sufficiently long to render the uncured fiber infusible. Once such infusibility has been achieved, further curing is unnecessary for purposes of this invention. At a temperature of 80°C, the time is about 10 hours, while at a temperature of about 100°c, the time is about 3 hours. It is generally preferred to carry out the curing by employing an initial room temperature and increasing the temperature to a final curing temperature of about 80° to about 100°C over a period of from about 1 to 3 hours and maintaining the temperature of a final curing temperature for residence time of about 2 to about 4 hours for a total curing time of from about 3 to about 10 hours.

When a low weight percent of novolac is employed in the pitch-novolac mixture, such as below about 10 percent novolac, it may be desirable to oxidize the fibers after curing. Although the curing step renders the fibers infusible, if a low weight percent of novolac is employed or if the diameter of the fiber is greater than about 20 microns, the fiber will smoke when subjected to a flame. It is believed that the additional steps of oxidizing promotes the formation of cross links whereby high polymer carbon material of insoluble and unmeltable characteristics is further produced. The oxidizing of the pitch-novolac fibers is performed by heating the cured fiber in air or other oxidizing atmosphere at a temperature of about 200°C to about 300°C. Preferably, the fibers are heated in air from about room temperature (25°C) up to a final temperature in the range of from about 200°C to about 300°C, the temperature being continually increased at the rate of from about 25°C per hour to about 100°C per hour, and continuing to heat in the air atmosphere at the final temperature for about 5 to about 60 minutes or longer.

This invention will be further described partly with reference to the following examples, which are intended to illustrate and not limit the scope of the invention.

EXAMPLE 1

A starting coal tar pitch (Allied Chemicals Company) has a softening point of 125°C, a beta-resin content of 22 percent, and a quinoline insoluble content of 13.6 percent. The pitch was mixed with a novolac resin (Varcum) having a molecular weight of about 800 to 1000 in the proportion of 70 percent by weight of pitch to 30 percent by weight of resin in the final mixture. The novolac and pitch were heated together to 190°C to form a homogeneous mixture and the resulting mixture was poured into a fiberization vessel. The vessel is a cylinder having an orifice at the bottom and a plunger at the top for forcing liquid through the orifice. The vessel is mounted onto the fiberization equipment which includes a spool attached to the shaft of a variable speed electric motor mounted beneath the vessel for gathering the fibers. The vessel is surrounded by an electrical heating coil connected to an adjustable source of electricity whereby a controlled amount of heat may be imparted to the vessel and its contents. The fibers are spun through the orifice of about 1.5 mm in length and a diameter of about 0.3 mm. The vessel containing the mixture of resin is maintained at a temperature of about 120°C while the bottom portion with the orifice is maintained at about 150°C. The mixture of pitch and novolac was driven through the orifice by a ram at a pressure of about 110 psi. The resulting mixed pitch-novolac filament has an average diameter of about 15 to 25 microns and taken up on a graphite cylindrical cone at the rate of 500 rpm. The fiber bundle obtained is cured by hanging the graphite cone containing the fiber on a graphite support and immmersing in a curing solution. The solution is prepared by mixing equal portions of aqueous solutions containing about 18 percent concentration of hydrochloric acid and paraformaldehyde, respectively. The curing solution with the graphite cone containing the fiber immersed therein is heated from room temperature to 100°C by increasing the temperature from 25° C to 50°C over a period of 1 hour, increasing the temperature from 50°C to 100°C over a period of ½ hour, and maintaining the temperature at 100°C for 4 hours for a total residence time of about 6 hours. The resulting fiber is infusible. It will not fuse when placed in a flame.

EXAMPLE 2

The fusible uncured fiber as prepared in Example 1 is placed in an aqueous solution containing about 2.8 percent ammonia hydroxide and about 32.4 percent formaldehyde. The fiber bundle is heated from room temperature to about 95°C over a period of about ½ hour and maintained at 95°C for about ½ hour. The fiber bundle is removed, dried for about 1 to 2 hours. The fiber is infusible when subjected to a flame.

EXAMPLE 3

The mixture of pitch and novolac resin as prepared according to the procedure of Example 1 was poured into a fiberizing vessel equipped with a nozzle. The nozzle is connected to a source of air pressure for flowing a mixture of pitch-novolac in air through the nozzle. The short staple fibers which are prepared in this manner are collected on a plate after being cooled by falling through the air. The nozzle is maintained at about 250°C and the air pressure used to blow the fibers is about 20 psi. The fibers collected in this manner are cured by placing in a graphite container and curing in the liquid stage in a manner similar to Example 1. The average diameter of the liquid cured fiber was about 10 to about 15 microns. These fibers were infusible when subjected to a flame.

EXAMPLE 4

The drawn fusible fibers prepared in Example 1 and the blown fusible fibers prepared in Example 3 were placed in a horizontal tube furnace. The fibers are cured in the vapor phase by flowing equal volumes of hydrochloric acid and para-formaldehyde gases through the furnace while the furnace as well as the incoming gases are slowly heated to 100°C from room temperature. The total residence time is about 6 hours. The fibers prepared in this fashion were infusible.

EXAMPLE 5

The cured pitch-novolac fibers of Examples 1 through 4 are placed in a graphite container and heated in an oven in air at a heating rate of 50°C per hour to 250°C from room temperature. The fibers remained were maintained at 250°C for about 15 minutes. The fibers were placed in a flame and exhibited no smoking.

While the invention has been described with reference to certain examples and preferred embodiments, it is to be understood that the various changes and modifications may be made by those skilled in the art without departing from the concepts of the invention.

What is claimed is:

1. An infusible fiber comprising an aldehyde cured homogeneous blend of from about 5 to about 40 percent of a novolac, said novolac having a molecular weight ranging from about 500 to about 1,200, and a pyrogenous residue having a beta-resin content greater than about 5 percent, said residue selected from the group consisting of coal tar pitch and pyrogenous asphalts.

2. A fiber according to claim 1 comprising a continuous filament having a diameter of from about 0.1 micron to about 300 microns.

3. A fiber according to claim 2 having a diameter from about 10 to about 30 microns.

4. A fiber according to claim 1 comprising the reaction product of said pyrogenous residue, said novolac and an aldehyde.

5. A fusible fiber comprising a homogenous mixture of from about 5 to about 40 percent of a novolac, said novolac having a molecular weight ranging from about 500 to about 1,200, and a pyrogenous residue having a beta-resin content greater than about 5 percent, said residue selected from the group consisting of coal tar pitch and pyrogenous asphalts.

6. A fiber according to claim 5 comprising at least about 10 percent by weight novolac.

7. A fiber according to claim 5 wherein said novolac has a molecular weight from about 500 to about 900.

8. A fiber according to claim 5 wherein said novolac is a phenol-formaldehyde novolac.

9. A fiber according to claim 1 in which said novolac is a phenol-formaldehyde novolac.

* * * * *